Jan. 10, 1928.　　　　　　　　　　　　　　　　1,655,445
C. H. TRIESCHMANN
AUTOMATIC BUMPER AND BODY CATCHER
Filed Feb. 14, 1927　　　2 Sheets-Sheet 1

INVENTOR.
Carl H. Trieschmann,
BY Morsell, Keeney & Morsell
ATTORNEYS

Jan. 10, 1928.

C. H. TRIESCHMANN 1,655,445

AUTOMATIC BUMPER AND BODY CATCHER

Filed Feb. 14, 1927

INVENTOR.
Carl H. Trieschmann,
BY Morsell, Keeney & Morsell
ATTORNEYS

Patented Jan. 10, 1928.

1,655,445

UNITED STATES PATENT OFFICE.

CARL H. TRIESCHMANN, OF MILWAUKEE, WISCONSIN.

AUTOMATIC BUMPER AND BODY CATCHER.

Application filed February 14, 1927. Serial No. 168,066.

This invention relates to improvements in automatic bumpers and body catchers, particularly adapted for motor vehicles.

It is one of the objects of the present invention to provide an automatic fender for self-propelled vehicles which will be instantly moved from a compact inoperative position to an extended operative position upon a portion thereof coming in contact with an obstruction.

A further object of the invention is to provide a device of the character described which in addition to being automatically operated by contact, may be manually operated from the driver's seat of the vehicle, or other convenient point remote from the bumper.

A further object of the invention is to provide a device of the character described which may be easily attached to all types of motor vehicles and propelled carriers, and which is neat and attractive in appearance and does not detract from the appearance of the vehicle.

A further object of the invention is to provide a spring controlled device of the chracter described which will cushion the shock or impact when a collision occurs.

A further object of the invention is to provide an automatic bumper and body catcher in which the latter portion is normally folded and concealed in flexible sections back of and below the bumper portion.

A further object of the invention is to provide a device of the character described in which the body catcher, when released, instantaneously and automatically unfolds, descends and adjusts itself to road conditions and paving level below the bumper, screening the entire road-width of the car, including the wheels.

A further object of the invention is to provide a device of the character described in which the body catcher is so constructed that when it is extended to operative position, it cannot buckle or jam backwardly, and which will automatically adjust itself to an uneven road bed.

A further object of the invention is to provide a device of the character described which will not interfere with manual cranking of the vehicle.

A further object of the invention is to provide an automatic bumper and body catcher which is of very simple construction, will not rattle, is strong and durable and is well adapted for the purposes described.

With the above and other objects in view, the invention consists of the improved bumper and body catcher for vehicles, and its parts and combinations as set forth in the claims, and all equivalents thereof.

In the accompanying drawings in which the same reference characters indicate the same parts in all of the views.

Figure 2:
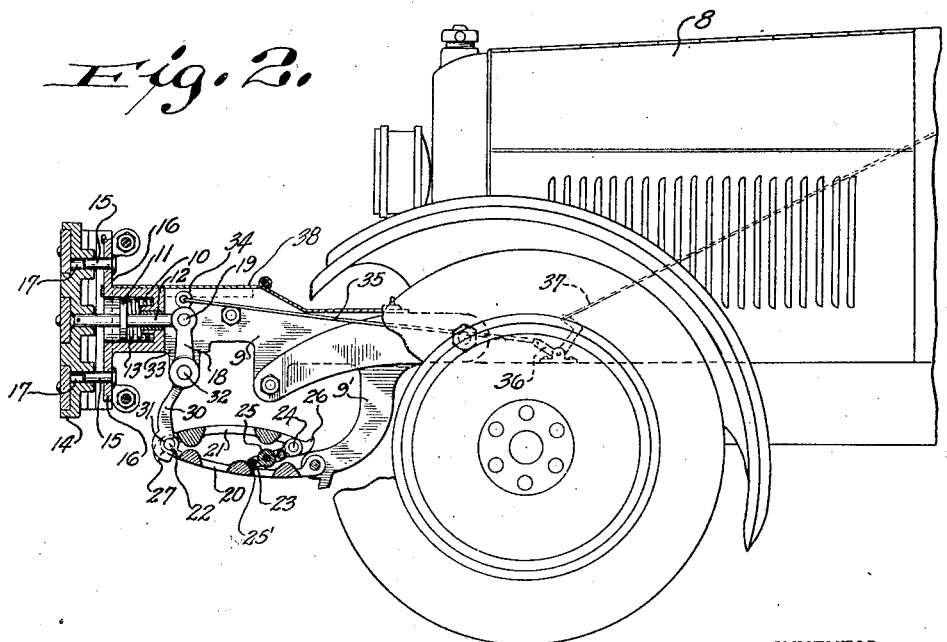
Fig. 2 is a view similar to Fig. 1, with portions of the bumper and body catcher broken away and shown in section.

Referring now more particularly to the drawings, it will appear that the numeral 8 designates a motor vehicle having secured to the front portion of the frame a pair of forwardly projecting arms 9. The forward portion of each arm is enlarged and bored to form a cylinder 10. A piston 11 is mounted in each cylinder on an extended rod 12 and said piston is adapted to move inwardly in the cylinder against the tension of a coiled spring 13. The forward end of each rod 12 is secured to and yieldingly supports the end portion of a bumper or buffer 14. The buffer 14 is also supported by means of studs 15 secured to and projecting from upper and lower flanged portions 16 of the cylinders 10, said studs entering bores 17 therefor in the buffer. Normally the buffer is supported slightly outwardly from the arms 9, as shown in Fig. 2. However, if the buffer strikes an obstruction, it will move inwardly slightly, against the tension of the springs 13, and the inner ends of the rods 12 will pivot cranks 18 secured thereto by pivot pins 19.

Figure 3:
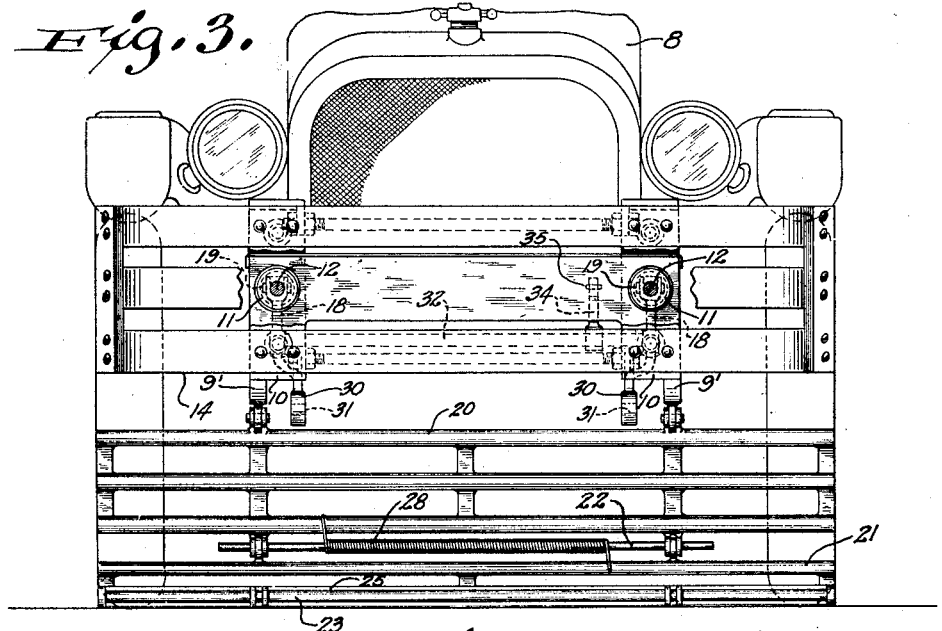
Fig. 3 is a front view of the vehicle and the device connected thereto, with the body catcher shown in operative position.
Figure 4:
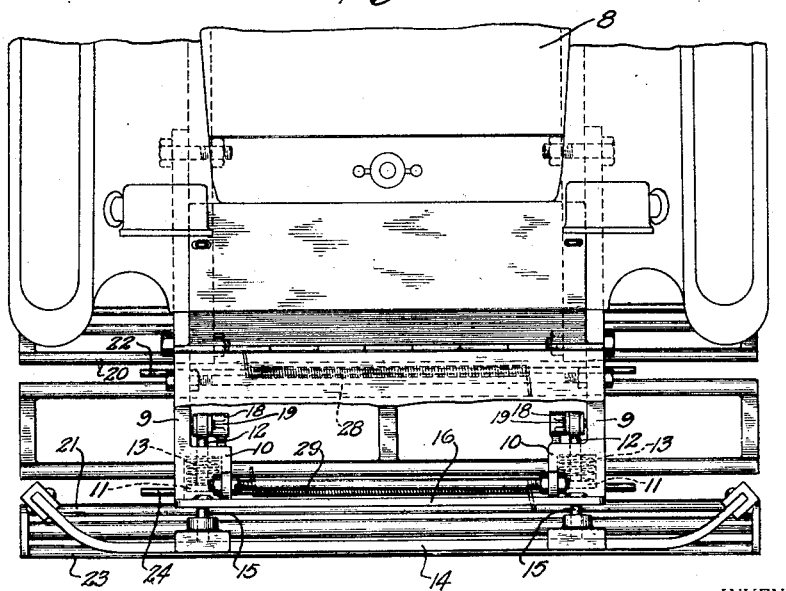
Fig. 4 is a plan view thereof.

The arms 9, extending from the forward portion of the vehicle, are also formed with curved, downwardly and forwardly projecting extensions 9' which have pivoted thereto the inner section 20 of a body catcher or fender. Said fender section extends transversely across the front of the vehicle, terminating at the outer edges of the vehicle wheels, and is formed of longitudinal spaced apart bars and connecting cross webbed portions, as clearly shown in Fig. 3. An intermediate fender section 21 is pivotally connected to the forward portion of the inner section 20 by a pivot rod 22 and said intermediate section, in turn, has pivotally connected to its front portion, by a pivot rod 24, a narrow outer fender section 23, which includes an elongated rubber covered roller 25 extending the entire width of the body catcher operating in contact with the pavement and a forward parallel leader roller 25', slightly elevated which, when in operation, acts as a leader over road obstructions and also as a skid under a body when the same is scooped up by the body catcher. Also, the intermediate section and front section are provided with lugs 26 and 27, the lugs 26 serving to elevate the section from the ground when it is lowered, and the lugs 26 and 27 engaging the adjacent sections to prevent buckling and limit the folding movement of the sections.

It should also be observed that a spring 28 is coiled about the pivot rod 22 and its end portions yieldingly engage the sections 20 and 21, respectively, to put the same under tension when extended with respect to each other for the purpose of preventing a folding tendency of said sections. A similar spring 29, for the same purpose, is coiled about the pivot rod 24 and engages the sections 21 and 23.

Figure 1:
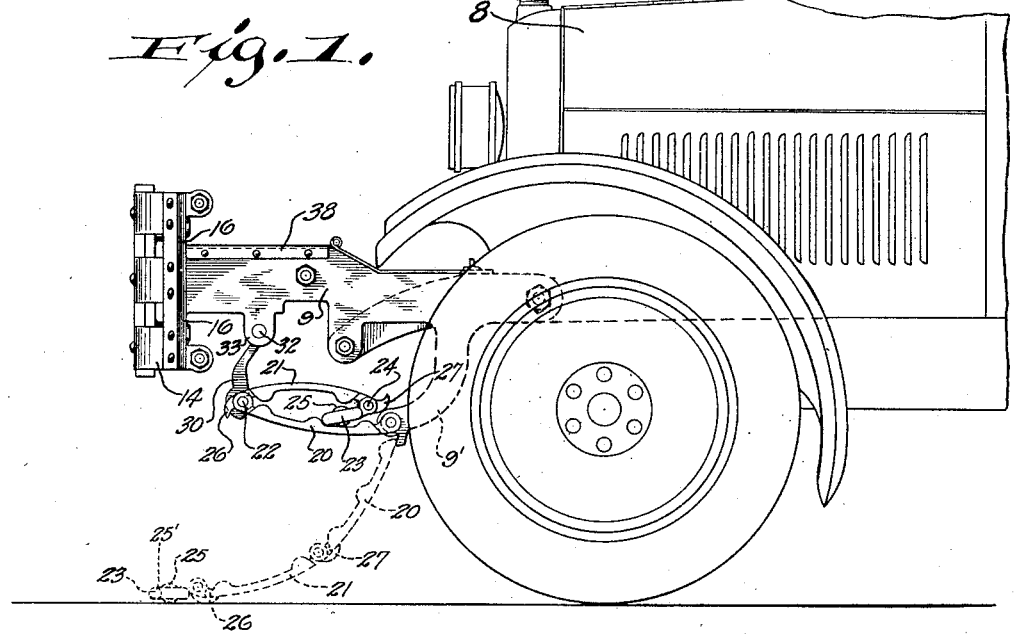
Fig. 1 is a side view of the front portion of a vehicle equipped with the improved bumper and body catcher, the dotted lines showing the body catcher in operative position.

In normal use, the buffer and fender are positioned as shown in Figs. 1 and 2, in full lines, with the fender sections folded. The sections are releasably held in this position by a pair of opposed arms or triggers 30 formed with recesses 31 which engage and hold the pivot rod 22 when said triggers 30 are in normal position. Said triggers 30 are formed integral with the pivot cranks 18 and said combined cranks and triggers are medially pivotally mounted on a transverse pivot rod 32 journaled at its end portions in the lug portions 33 of the supporting arms 9.

A lever 34 is also carried by the pivotal rod 32, and said lever is connected by means of a cable or rod 35 with a bell crank lever 36 pivotally mounted on a portion of the frame of the vehicle, as shown in Fig. 2. Said bell crank lever in turn has attached thereto one end of a connection 37 which extends up to the instrument board or adjacent the driver's seat. Hence, by means of the members 37, 36, 35 and 34, the driver of the vehicle may manually operate the triggers 30 to release and drop the fender, when necessary, and this may be done independent of any action on the buffer.

The space between the two arms 9 from the rear of the buffer to the front of the radiator is closed by means of a hinged cover 38 normally clamped in closed position, but which may be raised and folded back sufficiently to permit a person to step in close to the front of the machine if it is necessary to manually crank the same. The cover, in closed position, acts as a catcher for bodies which might be thrown over the top of the buffer.

From the foregoing description, it will be seen that the improved automatic bumper and body catcher is of very simple and novel construction, and is well adapted for the purposes described.

What I claim as my invention is:

1. In combination with a vehicle, a pair of arms secured thereto, a buffer yieldingly carried by said arms, a pair of opposed and connected trigger members, a sectional fender normally intermediately engaged and held in a folded horizontal position by said opposed trigger members rearwardly of and below said buffer, and mechanism connected with said trigger members and operated by an inward movement of any portion of said buffer for moving said trigger members to release and drop the fender.

2. In combination with a vehicle, a pair of arms secured thereto, a buffer yieldingly carried by said arms, a pair of opposed and connected trigger members, a sectional fender normally engaged and held in a folded position by said trigger members rearwardly of and below said buffer, yielding means between pairs of the fender sections and engaging the same, and mechanism connected with said trigger members and operated by an inward movement of the buffer for moving said trigger members to a fender releasing position.

3. In combination with a vehicle, a pair of arms secured thereto, a buffer yieldingly carried by said arms, a pair of opposed and connected trigger members, a sectional fender normally engaged and held in a folded position by said trigger members rearwardly of and below said buffer, coiled springs mounted between pairs of the fender sections and engaging the same and exerting an unfolding force against said sections, and mechanism connected with said trigger members and operated by an inward movement of the buffer for moving said trigger members to a fender releasing position.

4. In combination with a vehicle, a pair of arms secured thereto, a buffer yieldingly carried by said arms, a pair of opposed and connected trigger members, a sectional fender normally engaged and held in a folded position by said trigger members rearwardly of and below said buffer, mechanism connected with said trigger members and operated by an inward movement of the buffer for moving said trigger members to a fender releasing position, and means formed on said fender sections and engaging adjacent sections to prevent the same from buckling when the fender is in open position.

5. In combination with a vehicle, a pair of arms secured thereto, the forward portions of said arms being formed with cylinders, a buffer extending transversely with respect to said arms, pistons carried by said buffer and operable in said cylinders, coiled springs confined in the cylinders and exerting an outward force against said pistons, a rod journaled in said arms, a pair of opposed triggers carried by said rod, connections between the triggers and pistons for moving the triggers to a releasing position upon an inward movement of a piston, a sectional fender normally engaged and held in a folded position by said trigger members rearwardly of and below said buffer, yielding means between pairs of the fender sections and engaging the same, means formed on said fender sections and engaging adjacent sections to prevent the same from buckling when the fender is in open position, and auxiliary means connected with said triggers for manually operating the same.

6. In combination with a vehicle, a buffer yieldingly supported from the forward portion of the vehicle, a latch, a sectional fender normally engaged and held in a folded position by said latch rearwardly of and below the buffer, yielding means between pairs of the fender sections and engaging the same and exerting an unfolding force against said sections, and mechanism connected with the latch and operated by a movement of the buffer for moving the latch to release the fender.

In testimony whereof, I affix my signature.

CARL H. TRIESCHMANN.